United States Patent
Bray et al.

(10) Patent No.: US 11,492,211 B1
(45) Date of Patent: Nov. 8, 2022

(54) RETRACTABLE RAIL COMPONENTS FOR CONTAINER SHUTTLE RAILS

(71) Applicant: Amazon Technologies, Inc., Seattle, WA (US)

(72) Inventors: Michael Alan Bray, Elkhorn, NE (US); Rajeev Dwivedi, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/211,954

(22) Filed: Mar. 25, 2021

(51) Int. Cl.
*B65G 47/64* (2006.01)

(52) U.S. Cl.
CPC .................................. *B65G 47/648* (2013.01)

(58) Field of Classification Search
None
See application file for complete search history.

(56) References Cited

U.S. PATENT DOCUMENTS

| | | | | | |
|---|---|---|---|---|---|
| 4,215,837 | A | * | 8/1980 | Uozumi | E01B 25/28 246/433 |
| 4,484,526 | A | * | 11/1984 | Uozumi | E01B 25/28 246/433 |
| 5,325,789 | A | * | 7/1994 | Tapias | E01B 25/12 246/433 |

* cited by examiner

*Primary Examiner* — William R Harp
(74) *Attorney, Agent, or Firm* — Eversheds Sutherland (US) LLP

(57) ABSTRACT

Systems, methods, and computer-readable media are disclosed for retractable rail components for container shuttle rails. In one embodiment, an example system for a shuttle may include a linear rail segment, and a first retractable rail segment assembly disposed adjacent to the linear rail segment. The first retractable rail segment assembly may include a first rail segment configured to move vertically from a first position aligned with the linear rail segment to a second position that is retracted with respect to the linear rail segment, and a first actuator configured to push the first rail segment from the second position to the first position.

19 Claims, 10 Drawing Sheets

RETRACTABLE RAIL COMPONENTS FOR CONTAINER SHUTTLE RAILS

BACKGROUND

As users increasingly make online purchases, fulfillment of such purchases and other orders may become increasingly complicated. For example, a fulfillment center may have output of upwards of one million packages per day. With such demands, efficiency of logistics related to processing orders and packages may be important. For example, use of equipment to move or otherwise handle objects may improve efficiency. However, such equipment may create chokepoints or cause bottlenecks in fulfillment center operations. Accordingly, improvements in various operations and components of order fulfillment, such as improvements to picking technology, sorting technology, transport technology, packing technology, and so forth may be desired, such that manual efforts can be redirected to different tasks.

Figure 1:
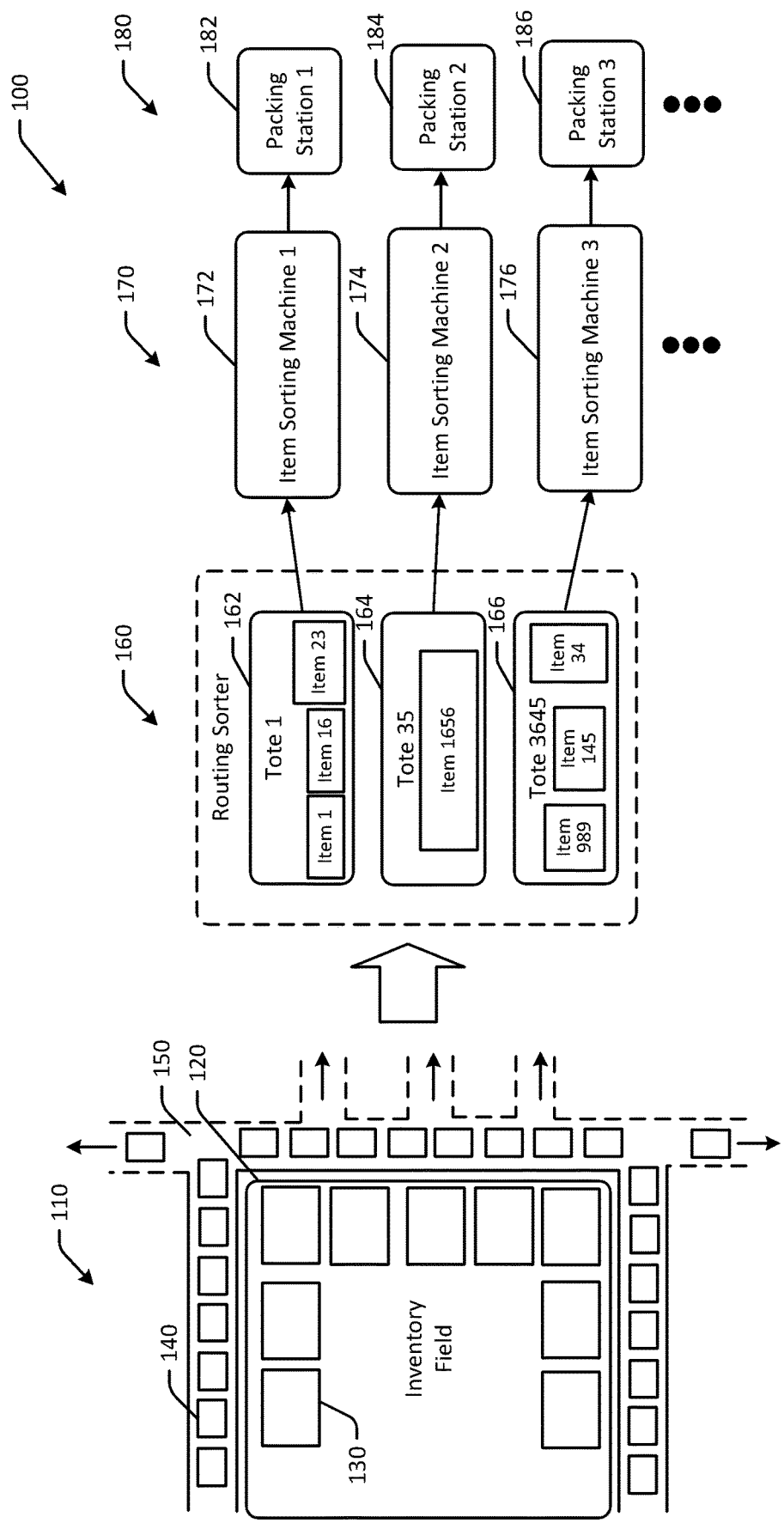
FIG. 1 is a hybrid schematic illustration of an example use case for retractable rail components for container shuttle rails in accordance with one or more embodiments of the disclosure.

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar, but not necessarily the same or identical components. Different reference numerals may be used to identify similar components. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Fulfillment centers may be used to fulfill online purchases and other orders. For example, fulfillment centers may include product inventory that may be pulled when an order for a particular product or multiple products is placed. In some instances, the product(s) may be packed and shipped from the fulfillment center. However, the process of obtaining the product(s), packing the product(s), and shipping the product(s) may be complicated due to the amount of inventory, the number of orders to process, the size of the fulfillment center, and/or other factors. In addition, a portion of the fulfillment center designated for packing or shipping may be different than the portion of the fulfillment center designated for holding product inventory. As a result, transportation of products in an order may be time consuming.

Moving items or objects through a fulfillment center may require handling of the item itself. For example, picking the item from inventory, placing the item into a container, removing the item from a container, and so forth may all be examples of actions for which an item may need to be handled. In addition, different items may have different types of packaging. For example, some items may come in boxes, some items may come in loose bags, some items may come shrink wrapped, some items may not have any packaging, and so forth. Humans may be able to manually handle individual items with ease. However, robotic handling of individual items may require various levels of dexterity. Moreover, fulfillment centers may include lengthy conveyors that may be used to transport objects, such as packages, products, items, or other objects, as well as containers that may be at least partially full of objects. Transport of containers or items (e.g., individual items or multiple items, etc.) may involve the use of container shuttles that move on one or more rails to transport a container from one location to another. For example, a container of items may be loaded onto a shuttle, and the shuttle may transport the container from an inventory field to a sortation system or other location. Movement of container shuttles along rails may be difficult in that the shuttle may have to execute a turn or may otherwise have to switch or shift from one set of rails to another. Switching between rails may be difficult due to high utilization of switching components, a frequency of switching operations to be performed by switching hardware, and low clearance space for magnet-driven shuttles. For instance, certain shuttles may include one or more magnets, such as permanent magnets, underneath the shuttle that interact with electromagnets disposed along a set of rails. The permanent magnet and electromagnets may work together to form a linear induction motor that propels the shuttle. However, the magnet coupled to the shuttle may extend below the upper edges of the rails on which the shuttle moves. Accordingly, in instances where the shuttle has to switch tracks or otherwise has move over a set of rails, the magnet under the shuttle may impact the set of rails over which the shuttle passes.

To solve such issues, embodiments of the disclosure provide retractable rail systems that include retractable rail segments that retract to provide clearance for the magnets disposed under the shuttle, such that the shuttle can cross over the rail without the magnet impacting the rail. Some embodiments may include curved retractable rail segments, linear retractable rail segments, and other components. The retractable rail segments may include various mechanisms, such as springs and actuators, to provide rapid retraction and highly repeatable performance in a durable manner, such as over 5 million cycles. In some embodiments, the retractable rail components may allow for shuttles to make turns or to otherwise move from rails in one direction to rails in another direction, while maintaining the ability for the shuttle to be powered by electromagnets or other hardware. Some embodiments include retractable rail components that provide rapid switching performance, as well as durable and repeatable structure that allow for minimal maintenance under heavy use. As a result of the durability and rapid switching provided by the flexible rail component design described herein, flexibility of the processing of items at the fulfillment center may be increased, such as by providing the ability to connect systems that may otherwise be disconnected. For example, an induction system may be coupled to a sortation system via the flexible rail components described herein. In addition, throughput of the fulfillment center may be increased and overall efficiency may be improved.

In a typical warehouse environment, such as that illustrated in FIG. 1, items may be transported through various means such as conveyors, belts, shuttles, etc. as they undergo different operations like picking, sorting, storing, shipping/dispatch, and so forth. In some of these cases, containers may be used to transport items, either individually or in groups, from one location to another. For instance, transporting items from a pick station to a sort station may involve the item(s) being picked into a container, such as a tote, which may then be transported via a shuttle.

Embodiments of the disclosure include methods and systems for retractable rail components for container shuttle rails that may improve processing and fulfillment of orders. Certain embodiments include retractable rail mechanisms that are configured to retract and provide clearance for shuttle magnets during redirection of a shuttle from one path or set of rails to another. Some embodiments may include curved retractable segments, thereby providing a smooth transition for a shuttle riding on the curved rails. Embodiments of the disclosure include retractable rail components that not only move from upwards extended positions to downwards retracted positions rapidly, and can also be individually actuated and provide highly repeatable performance, so as to provide a smooth path for a shuttle to move along. Some embodiments include optimized process flows for processing of orders at fulfillment centers, as well as process flows or methods to increase speed of consolidating products in a multi-item order as a result of improved speed in placing items into containers and removing items from containers. As a result, throughput of fulfillment centers may be improved, and/or logistics of fulfillment center operations may be less complicated.

Referring to FIG. 1, an example use case 100 for retractable rail components for container shuttle rails is depicted in accordance with one or more embodiments of the disclosure. Although discussed in the context of online orders, other embodiments may be directed to any suitable use case where containers are transported, such as instances where objects are picked from inventory, placed into containers, containers are transported, and so forth.

In FIG. 1, a fulfillment center may be a traditional fulfillment center and may include an inventory field 110, a routing sorter 160, one or more item sorting machines 170, and one or more packing stations 180. The inventory field 110 may include a storage platform, or a portion of the fulfillment center at which products picked from product inventory are placed. Robots may be used to pick products from inventory and to deliver to the robotic storage platform in some instances, while in other instances, manual labor or a combination thereof may be used to pick products. The picking process at the robotic storage platform may include locating a product in an order, obtaining the product, and sending the product to a robotic storage platform, such as via a conveyor belt. In the illustrated embodiment, products at the robotic storage platform may be placed in a container, such as a tote.

The inventory field 110 may include multiple items that are in inventory. The items may be used to fulfill orders. The inventory field 110 may be a robotic field in some instances. One or more picking stations 130 may be positioned along a perimeter 120 of the inventory field 110. The picking stations 130 may be manually operated or may include robotic components, or a combination thereof. In some instances, picking of items from the inventory field 110 may be completed by robots that include automated robotic arms, where the items are delivered to the picking stations 130 after being retrieved from the inventory field 110. Any number of picking stations 130 may be included, and the picking stations 130 may be located in a different position than that illustrated in FIG. 1.

In a traditional fulfillment center, such as that illustrated in FIG. 1, one or more conveyors 150 may be disposed about the inventory field 110. For example, conveyors 150 may be disposed along the perimeter 120 of the inventory field 110. The conveyors 150 may run adjacent to the picking stations 130 in some embodiments. Any suitable conveyor configuration may be used. In the illustrated example, the conveyors 150 may include belts or rollers that run alongside the picking stations 130 and include one or more paths to one or more routing sorters.

The conveyors 150 may be used to transport one or more containers, such as totes 140. For example, as totes 140 move along the conveyors 150, items may be moved from the picking stations 130 into respective totes 140. The totes 140 may be associated with particular item sorting machines, and may be moved using the conveyors 150 to a routing sorter 160. In contrast, embodiments of the disclosure may not include some or all of the conveyors 150, and instead may include rails that may be used to guide shuttles from one location to another. The rails may have retractable rail components for container shuttle rails that allow for shuttles to move from a set of rails oriented in one direction to another set of rails.

The routing sorter 160 may be configured to route, divert, or otherwise guide certain totes to an item sorting machine. The routing sorter 160 may include any combination of ramps, slides, rollers, arms, guides, and/or other components to route totes to a particular item sorting machine. At the routing sorter 160, totes including products that have been picked may be routed to the appropriate or designated item sorting machine. For example, the routing sorter 160 may determine an identifier associated with the tote, and may determine an item sorting machine associated with the tote using the identifier. The routing sorter 160 may route or direct the tote to the appropriate item sorting machine.

A number of item sorting machines 170 may be coupled to the routing sorter 160. For example, a first item sorting machine 172, a second item sorting machine 174, a third item sorting machine 176, and so forth may be coupled to the routing sorter 160. The routing sorter 160 may optionally guide totes to the item sorting machines to which they are assigned. For example, a first tote 162 may include item 1, item 16, and item 23, and may be assigned to the first item sorting machine 172. The routing sorter 160 may therefore route the first tote 162 to the first item sorting machine 172 for sortation of the respective items. A second tote 164 may include item 1656, and may be assigned to the second item sorting machine 174. The routing sorter 160 may therefore route the second tote 164 to the second item sorting machine 174 for sortation of the item. A third tote 166 may include item 989, item 145, and item 34, and may be assigned to the third item sorting machine 176. The routing sorter 160 may therefore route the third tote 166 to the third item sorting machine 176 for sortation of the respective items.

Some or all of the item sorting machines may be associated with one or more packing stations 180 that may be used to pack items into a shipment when a multi-item order is complete. For example, the first item sorting machine 172 may be coupled to a first packing station 182, the second item sorting machine 174 may be coupled to a second packing station 184, the third item sorting machine 176 may be coupled to a third packing station 186, and so forth. The item sorting machines may be configured to receive items from totes that have one or more, or multiple, items. The number of totes and/or the number of items associated with respective item sorting machines may be balanced, and multiple totes may be routed to the first item sorting machine 172 and the second item sorting machine 174 at the same time.

At any of the stages of the example fulfillment process of FIG. 1 where handling of containers is used, retractable rail components for container shuttle rails systems and methods as described herein may be used. As a result, manual effort can be redirected to other tasks.

Embodiments of the disclosure include systems and methods for retractable rail components for container shuttle rails. Certain embodiments may improve processing speed and/or throughput of fulfillment centers. Certain embodiments may improve performance of mechanical equipment for sortation and/or consolidation of items. While described in the context of online orders, aspects of this disclosure are more broadly applicable to other forms of object handling.

Example embodiments of the disclosure provide a number of technical features or technical effects. For example, in accordance with example embodiments of the disclosure, certain embodiments of the disclosure may improve processing speed, throughput, and/or efficiency of fulfillment centers. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of the embodiments disclosed herein are also within the scope of this disclosure. The above-described embodiments and additional and/or alternative embodiments of the disclosure will be described in detail hereinafter through reference to the accompanying drawings.

Illustrative Embodiments and Use Cases

Figure 2:
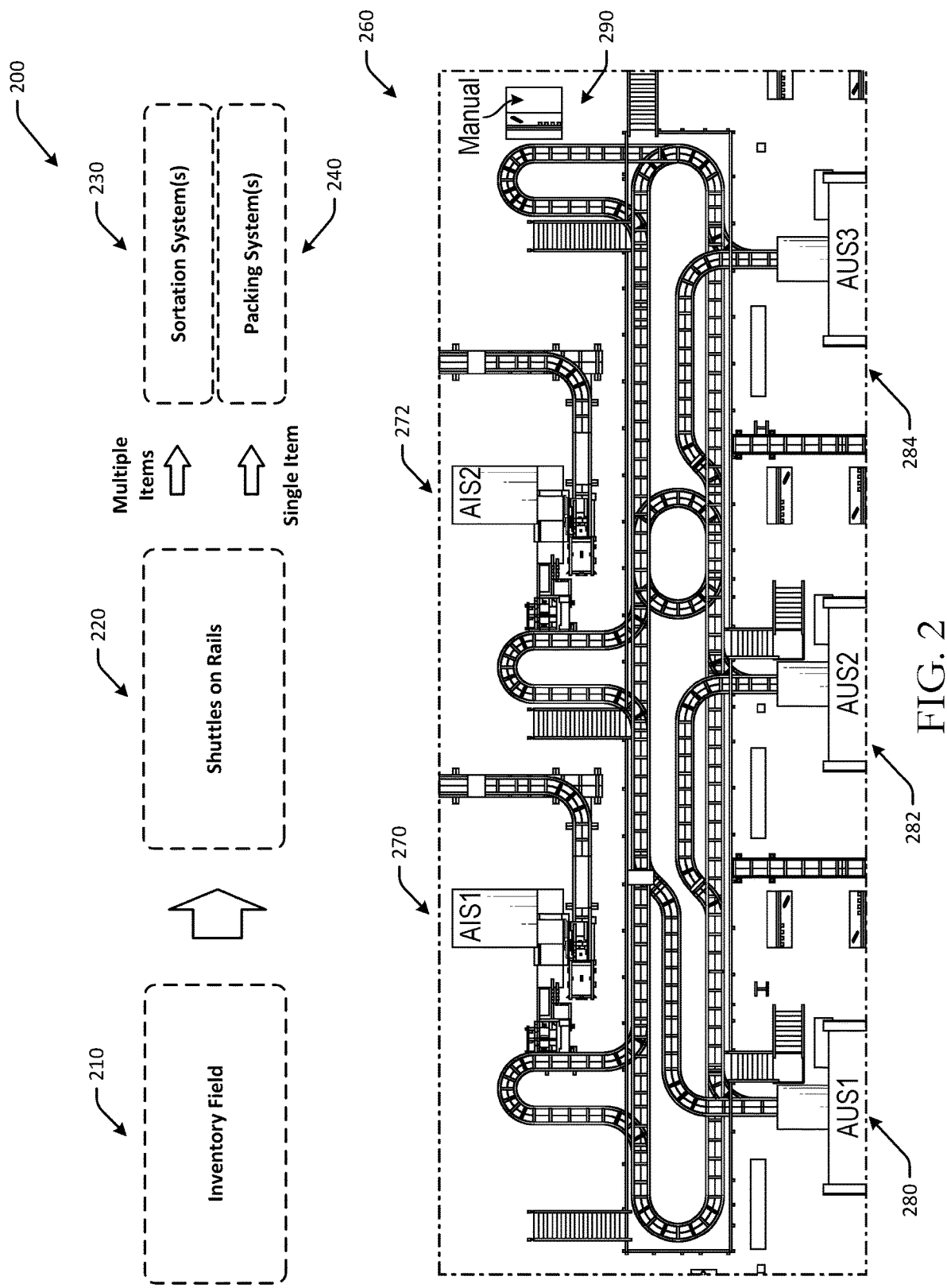
FIG. 2 is a schematic illustration of an example use case and facility layout for retractable rail components for container shuttle rails in accordance with one or more embodiments of the disclosure.

FIG. 2 is a schematic illustration of an example use case 200 and facility layout for retractable rail components for container shuttle rails in accordance with one or more embodiments of the disclosure. Other embodiments may include additional or fewer components. The illustration of FIG. 2 may not be to scale, and may not be illustrated to scale with respect to other figures.

In FIG. 2, a fulfillment center may include an inventory field 210, at which products or other items may be stored in inventory. As the items are ordered in online orders, the products may be picked from the inventory field 210 and routed for downstream processing in the fulfillment center. The items may be picked manually, using vehicles, or a combination thereof.

The picked products may be placed into one or more containers and the containers may be transported using one or more shuttles, such as one or more shuttles on rails 220. The shuttles on rails 220 may include container shuttles that are configured to transport items and/or containers from one location to another via rails. The rails may include retractable rail components that allow for the shuttles to move from one set of rails to another. The shuttles on rails 220 may transport containers from the inventory field 210 to one or more downstream processes, such as a sortation system 230, or a packing system 240. For example, the sortation system 230 may be a system at which items picked from the inventory field 210 may be re-sorted into respective totes or other containers for particular orders. For example, items for different orders may be placed into containers that are transported by the shuttles on rails 220 from the inventory field 210. The containers may be sent to the sortation system 230 for sorting into particular orders. The packing system 240 may be a station at which one or more items associated with an order may be packed into a box or other container for shipment. A shipping label may be applied and the package may be dispatched to a loading dock or elsewhere for shipment. Other destinations or downstream processes in addition to, or instead of, the sortation systems and packing systems may be used.

A rail system 260 is depicted in schematic view in FIG. 2. The rail system 260 is an example of a network of rails that may be used by shuttles to transport containers from one location to another. The network of rails may include locations at which a shuttle can be directed to a straight path or to a loop, turn, oval, circle, and/or other geometries that involve a change in direction of a shuttle on the rails. Such changes in direction may be implemented using the retractable rail components described herein. The rail system 260 may include rails that link various systems, such as sortation systems, to each other and/or to other systems, such as container handling systems, manual induction systems 290, and so forth. For example, the rail system 290 may link a first sortation system 270 to a second sortation system 272, as well as to a first container handling system 280, a second container handling system 282, a third container handling system 284, and so forth. The rail system 260 may be used to connect any of the systems to each other and/or other systems.

Shuttles may move along the rails of the rail system 260. The shuttles may include linear drive motors or other drive components. Some drive components may provide a drive force via electromagnetism. As a result, one or more electromagnets may be disposed along the network of rails. Shuttles may optionally include a conveyor belt that may have a first set of one or more raised flaps and a second set of one or more raised flaps. The first set of raised flaps may form a first barrier along a first open-ended side of the shuttle, and the second set of raised flaps may form a second barrier along a second open-ended side of the shuttle to prevent items rolling off of the conveyor belt. The shuttles may include an on-board drive motor configured to move the conveyor belt in a forward direction and/or a reverse direction. The shuttles may include a magnet disposed on a lower surface of the shuttle. The magnet may be used to propel and/or secure the shuttle. For example, the magnet may prevent the shuttle from moving while the vehicle is in motion and the linear drive motor is engaged. To onboard or offload containers, the linear drive motor of the shuttle or other component may be used in conjunction with the magnet to impart motion.

Figure 3:
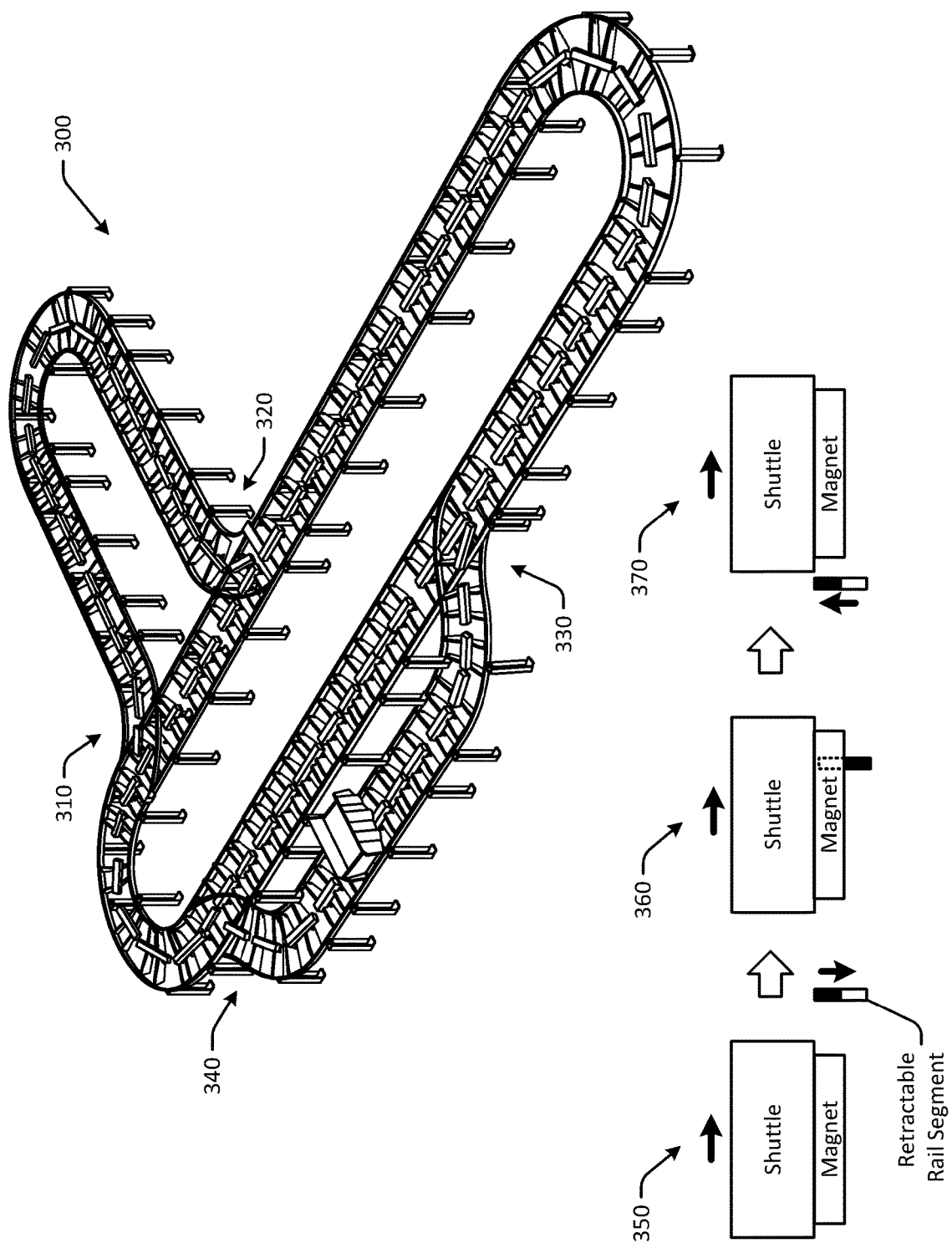
FIG. 3 is a schematic illustration of a perspective view of a retractable rail system in accordance with one or more embodiments of the disclosure.

FIG. 3 is a schematic illustration of a perspective view of a retractable rail system 300 in accordance with one or more embodiments of the disclosure. Other embodiments may include additional or fewer components. The illustration of FIG. 3 is not to scale, and may not be illustrated to scale with respect to other figures. The system illustrated in FIG. 3 may include the same retractable rail components for container shuttle rails discussed with respect to FIGS. 1-2, and/or may be used with any of the systems described herein.

The retractable rail system 300 may be configured to provide continuous rail for switching the direction of a shuttle in an electromagnetically propelled shuttle-on-rail arrangement. Shuttle-on-rail arrangements may be used in many systems, such as sortation systems, pick systems, delivery systems, etc. The retractable rail system 300 may include rail switch mechanisms to allow the rail to be directed to alternate path. Shuttle-rail arrangements that are based on electromagnetic propulsion, such as linear drive motors, may have sets of electromagnets arranged along the direction of the rails. Shuttles may also have a magnet, such as a permanent magnet, coupled to a lower side of the shuttle. The electromagnet and the permanent magnet may have to be separated by a very narrow gap for optimal performance. For motion along a uniform non-branching path, the gap may be easy to maintain. However, when a path created by the rails has multiple branches (e.g., emanating, merging, etc.) the rail from one path intersects the electromagnets of another path. Embodiments of the disclosure include an actuated rail mechanism to prevent contact between the magnet on the shuttle and the rail.

For example, the retractable rail system 300 may include a first branched path 310, where if shuttles were moving along the retractable rail system 300 in a clockwise direction, the shuttle could move in either a straight direction along the oval path of the retractable rail system 300, or may make a left-handed curve onto a separate path of the retractable rail system 300. Similarly, a second branched path 320 may allow for merging of shuttles that took a left curve at the first branched path 310 to merge back onto the oval path of the retractable rail system 300. Any number of curved path and straight path intersections may be included in the retractable rail system 300. For example, the retractable rail system 300 may include a third branched path 330 and a fourth branched path 340.

At any of the branched paths, the shuttle may move from one set of rails to another set of rails. During this transfer, one or more retractable rail components may be used to provide clearance for the magnet disposed under the shuttle to move between sets of rails without impacting any of the rails.

A schematic illustration of an example shuttle in motion is depicted in FIG. 3. At a first point in time 350, the shuttle may be approaching a retractable rail segment. The retractable rail segment may be in an upwards, or non-retracted, position. As the shuttle approaches, the retractable rail segment may be moved into a retracted position or a downwards position, such that the magnet under the shuttle does not impact the retractable rail segment, and clearance is provided for the magnet to pass over the retractable rail segment. At a second point in time 360, the shuttle may pass over the retractable rail segment. The retractable rail segment may remain in the retracted position while the shuttle passes over the retractable rail segment. The magnet under the shuttle may pass over the retractable rail segment in the retracted position. At a third point in time 370, the shuttle may clear or pass over the retractable rail segment. The retractable rail segment may then be moved or otherwise actuated to the upwards position, or the non-retracted position. Depending on the number of rails in a system, one or more retractable rail segments may be actuated in tandem in the same or opposite directions. For example, a first retractable rail segment may be actuated to a retracted position, and a second retractable rail segment may be actuated to a non-retracted position at the same time.

FIGS. 4A-4D depict various views of portions of a retractable rail system in accordance with one or more example embodiments of the disclosure. Other embodiments may include additional or fewer components. The illustration of FIGS. 4A-4D are not to scale, and may not be illustrated to scale with respect to other figures. The system illustrated in FIGS. 4A-4D may include the same retractable rail system discussed with respect to FIGS. 1-3.

Figure 4A:
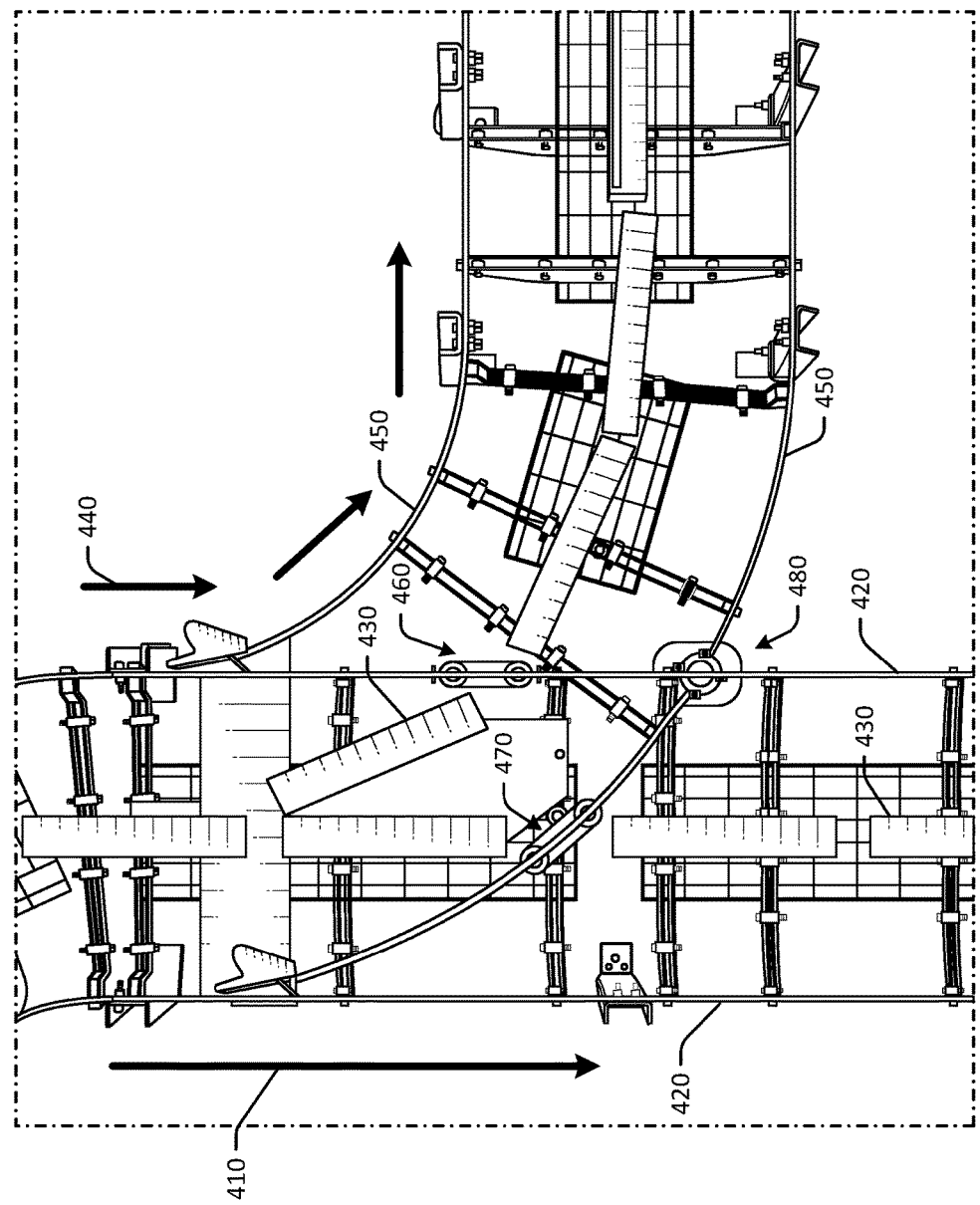
FIGS. 4A-4D are schematic illustrations of various views of portions of a retractable rail system in accordance with one or more example embodiments of the disclosure.

FIG. 4A depicts a portion of a retractable rail system 400 in a top view. The retractable rail system 400 may include one or more sets of rails on which shuttles may ride. The rails may guide shuttles to various locations. Each set of rails may include two rails, so as to support two sides of a shuttle on the rails. The retractable rail system 400 may include a number of supports disposed between the two rails of a set of rails. A number of electromagnets 430 may optionally be disposed along the rails at various intervals.

The retractable rail system 400 may include one or more switch points, such as that illustrated in FIG. 4, where a shuttle may switch from a straight direction of travel to a curved direction of travel. For example, to travel in a straight direction, the shuttle may travel along a first set of rails 420, and to travel in a different direction (e.g., curve, turn, etc.), the shuttle may travel along a second set of rails 450. In some embodiments, there may be junctions that include not only the linear rail section and the right-hand curved rail section, but a left-hand curved rail section as well.

A shuttle may travel along the portion of the retractable rail system 400 in either a straight direction, or along a first path 410, or may turn or otherwise be directed in a curved direction, or along a second path 440. The first path 410 may be formed by the first set of rails 420, and the second path 440 may be formed by the second set of rails 450. Any number of electromagnets 430 may be disposed along the retractable rail system 400. For example, a set of electromagnets 430 may disposed along both the first path 410 and the second path 440. The electromagnets 430 may be configured to propel shuttles along the respective sets of rails.

To execute a switch between the first set of rails 420 and the second set of rails 450 without interfering with the magnet coupled to the shuttle, the retractable rail system 400 may include a first retractable rail segment assembly 460 and a second retractable rail segment assembly 470. As illustrated in close-up perspective view 490 of FIG. 4B, the first retractable rail segment assembly 460 may be disposed on the first set of rails 420, and may be positioned at or near a middle of the second set of rails 450. For example, the first retractable rail segment assembly 460 may be disposed at the rail of the first set of rails 420 that a shuttle crosses over when moving from the first set of rails 420 to the second set of rails 450. The second retractable rail segment assembly 470 may be disposed at or near a middle of the first set of rails 420, and may be positioned such that a shuttle moving along the first set of rails 420 passes over the second retractable rail segment assembly 470.

The first retractable rail segment assembly 460 may be a straight or linear retractable rail segment assembly, and the second retractable rail segment assembly 470 may be a curved retractable rail segment assembly. This may be because the first retractable rail segment assembly 460 is disposed along a straight portion of rail, and the second retractable rail segment assembly 470 is disposed along a curved portion of rail. The first retractable rail segment assembly 460 is discussed in detail with respect to FIG. 5. The second retractable rail segment assembly 470 is discussed in detail with respect to FIG. 6.

During operation of the retractable rail system 400, if a shuttle traveling along the retractable rail system 400 is turning, or moving from the first set of rails 420 to the second set of rails 450, the first retractable rail segment assembly 460 may be moved into a downwards or retracted position, and the second retractable rail segment assembly 470 may be moved into an upwards or non-retracted position. In this manner, the shuttle and magnet may pass over the first retractable rail segment assembly 460 without contact or impact, and the second retractable rail segment assembly 470 may provide a rail along which the shuttle can ride to make the turn from the first set of rails 420 to the second set of rails 450.

In contrast, if a shuttle traveling along the retractable rail system 400 is remaining in a straight direction, or moving along the first set of rails 420 passed the second set of rails 450, the first retractable rail segment assembly 460 may be moved into an upwards or non-retracted position, and the second retractable rail segment assembly 470 may be moved into a downwards or retracted position. In this manner, the shuttle and magnet may pass over the second retractable rail segment assembly 470 without contact or impact, and the first retractable rail segment assembly 460 may provide a rail along which the shuttle can ride to continue along the first set of rails 420 without interruption in the rail.

Figure 4B:
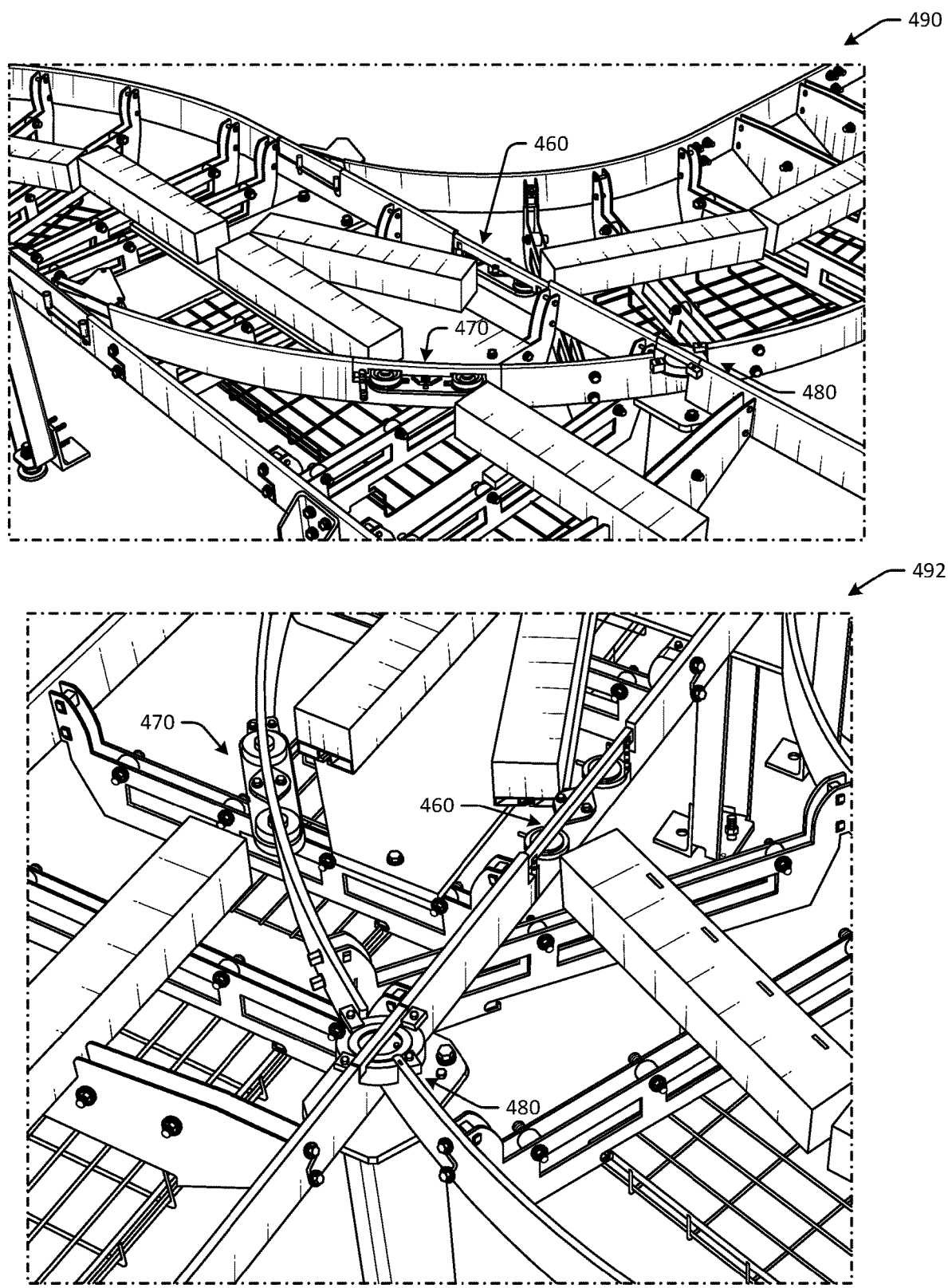

As illustrated in perspective view 492 of FIG. 4B, the retractable rail system 400 may include a rotating rail segment 480. The second set of rails 450 may intersect with the first set of rails 420 at a point, and the rotating rail segment 480 may be located at the point of intersection. The rotating rail segment 480 may be configured to slide, rotate, or otherwise move from a first position aligned with the linear or straight rail segment of the first set of rails 420 to a second position aligned with the curved rail segment of the second set of rails 450. The rotating rail segment 480 may move along a bronze thrust bushing, and, in one embodiment, may have an angle of rotation of about 60 degrees using a pneumatic actuator.

Figure 4C:
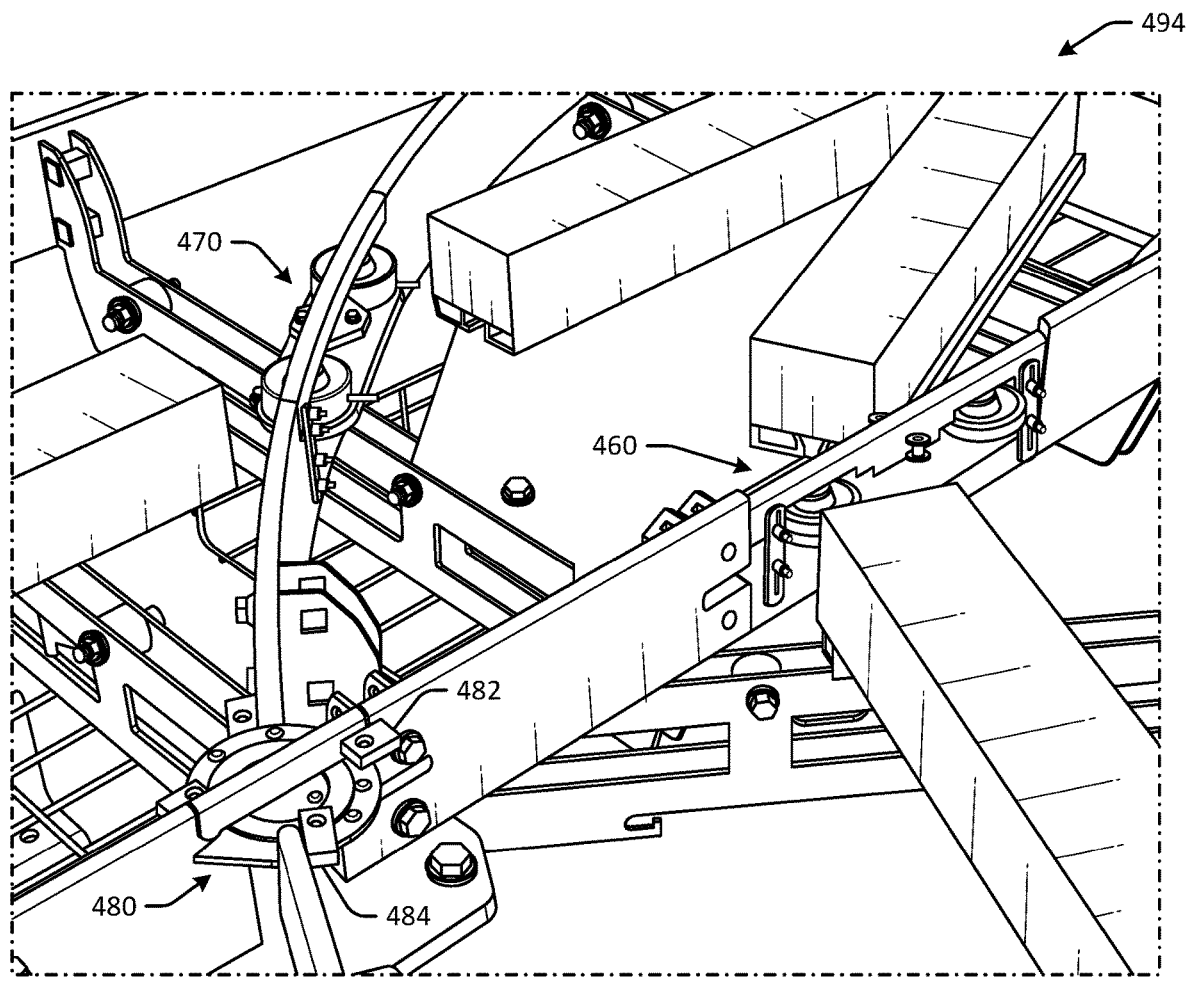
Figure 4C:
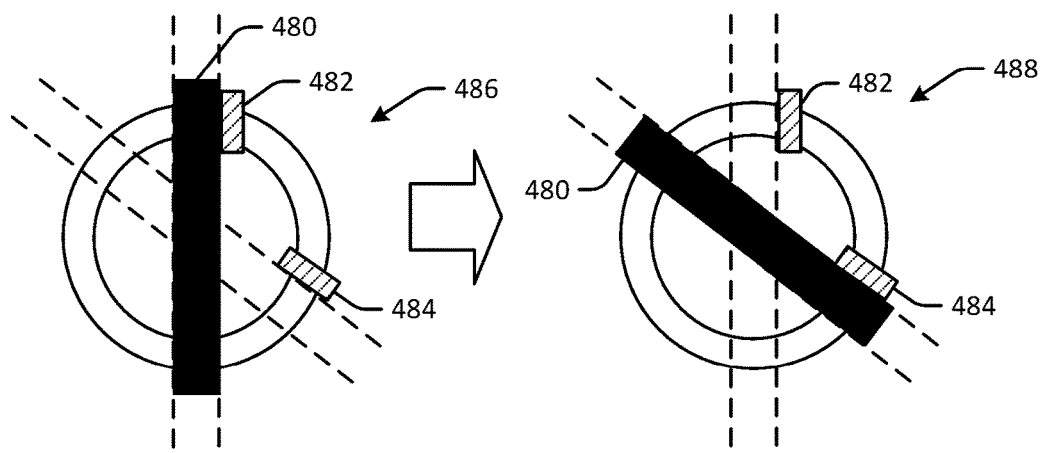

In FIG. 4C, the rotating rail segment 480 is depicted as part of the retractable rail system in perspective view 494, as well as in isolated schematic views. The rotating rail segment 480 may be configured to slide, rotate, or otherwise move from a first position 486 aligned with the linear or straight rail segment of the first set of rails 420 to a second position 488 aligned with the curved rail segment of the second set of rails 450. One or more supports or backstops may be used to control positioning of the rotating rail segment 480. For example, a first backstop 482 may support the rotating rail segment 480 in the first position 486, and a second backstop 484 may support the rotating rail segment 480 in the second position 488.

The retractable rail system 400 may include an actuator configured to rotate or otherwise actuate the rotating rail segment 480 from the first position to the second position. The rotating rail segment 480 may therefore provide a continuous portion of rail for a shuttle to pass over in both the straight and curved directions. The rotating rail segment 480 may be configured to switch or toggle between the first position and the second position.

For example, when the first retractable rail segment assembly 460 is in a downwards or retracted position, the rotating rail segment 480 may be aligned with the curved rail or second set of rails 450. When the first retractable rail segment assembly 460 is in an upwards or non-retracted position, the rotating rail segment 480 may be aligned with the straight or linear rail segment or first set of rails 420. Similarly, when the second retractable rail segment assembly 470 is in a downwards or retracted position, the rotating rail segment 480 may be aligned with the first set of rails 420. When the second retractable rail segment assembly 470 is in an upwards or non-retracted position, the rotating rail segment 480 may be aligned with the second set of rails 420.

Figure 5:
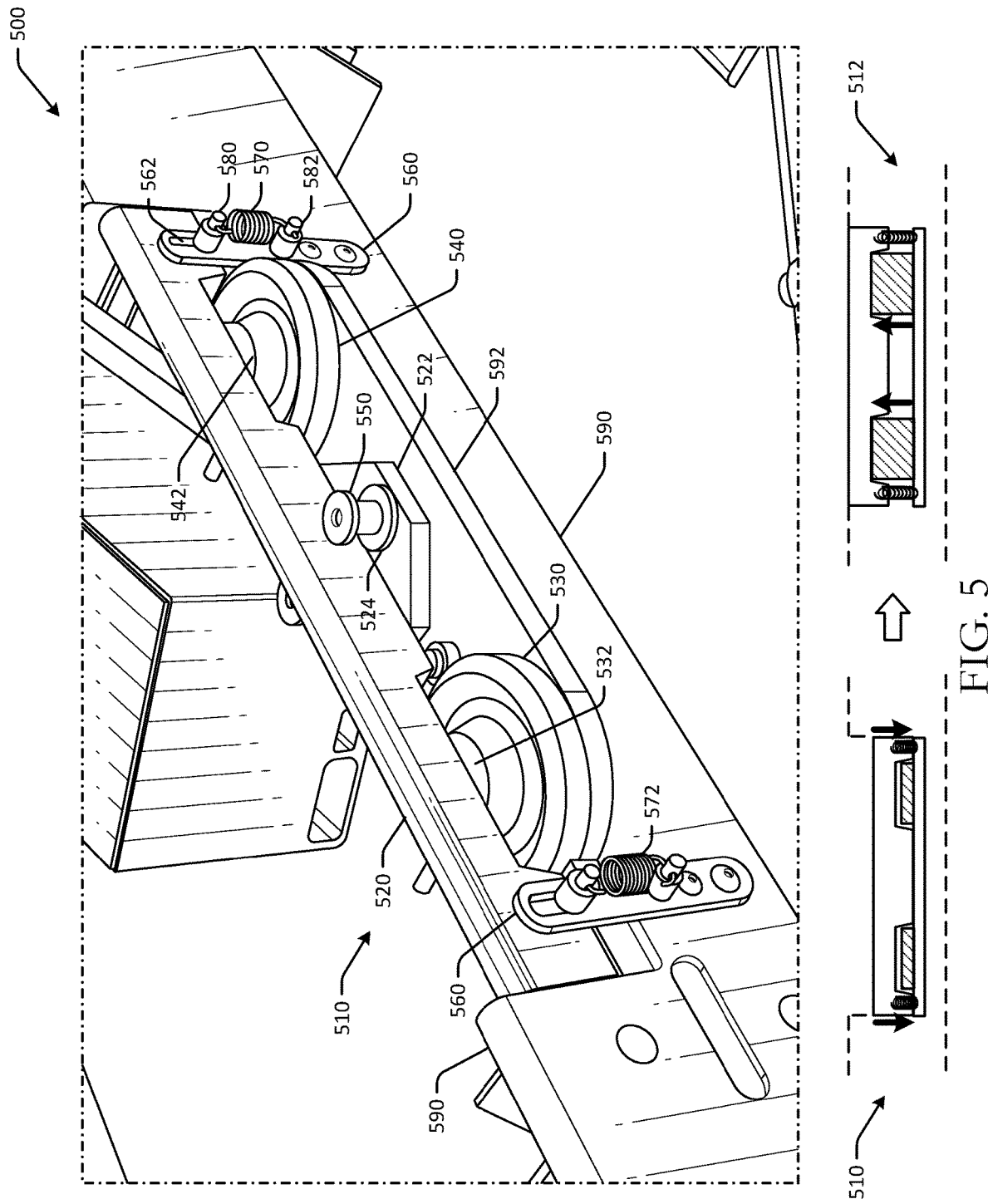
FIG. 5 is a schematic illustration of a retractable rail segment assembly in accordance with one or more embodiments of the disclosure.
Figure 6:
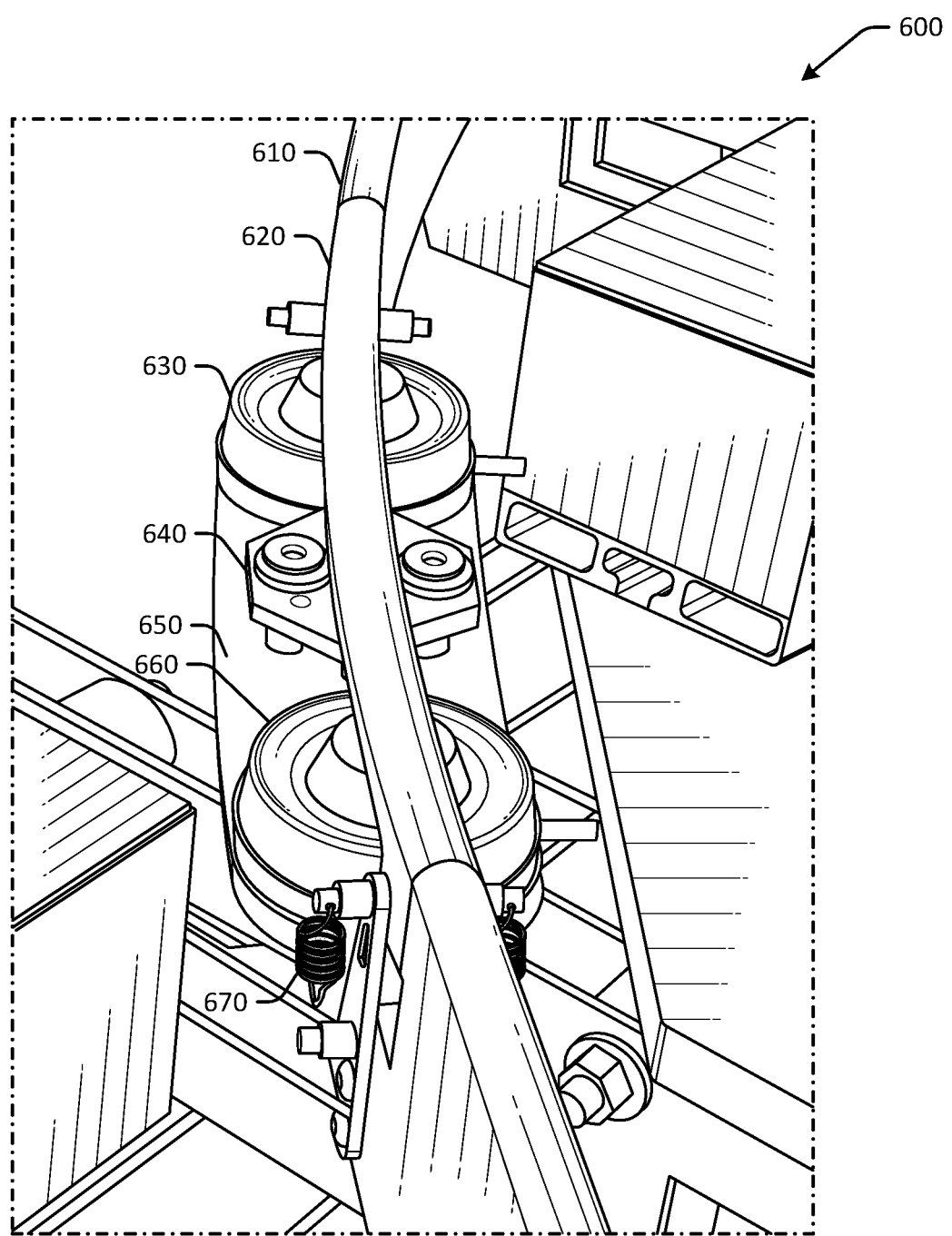
FIG. 6 is a schematic illustration of a retractable rail segment assembly in accordance with one or more embodiments of the disclosure.

As discussed with respect to FIGS. 5 and 6, to actuate the first retractable rail segment assembly 460 and the second retractable rail segment assembly 470, an actuator may be used to push a segment of rail upwards, such that the segment of rail is aligned with the remained of the respective linear set of rails 420 and curved set of rails 450. For example, an actuator such as pneumatic bellow(s), cylinder, solenoid, etc., may be used for actuation. One or more biasing members, such as springs, may be used to retract the rail segments to the retracted position. The precise position of the rail segments coupled to the first retractable rail segment assembly 460 and the second retractable rail segment assembly 470 may be controlled by coupling mechanical constraints to the respective rail segments. The rotating rail segment 480 may be actuated by any suitable actuator, such as a pneumatic actuator, a solenoid, or other actuator.

Figure 4D:
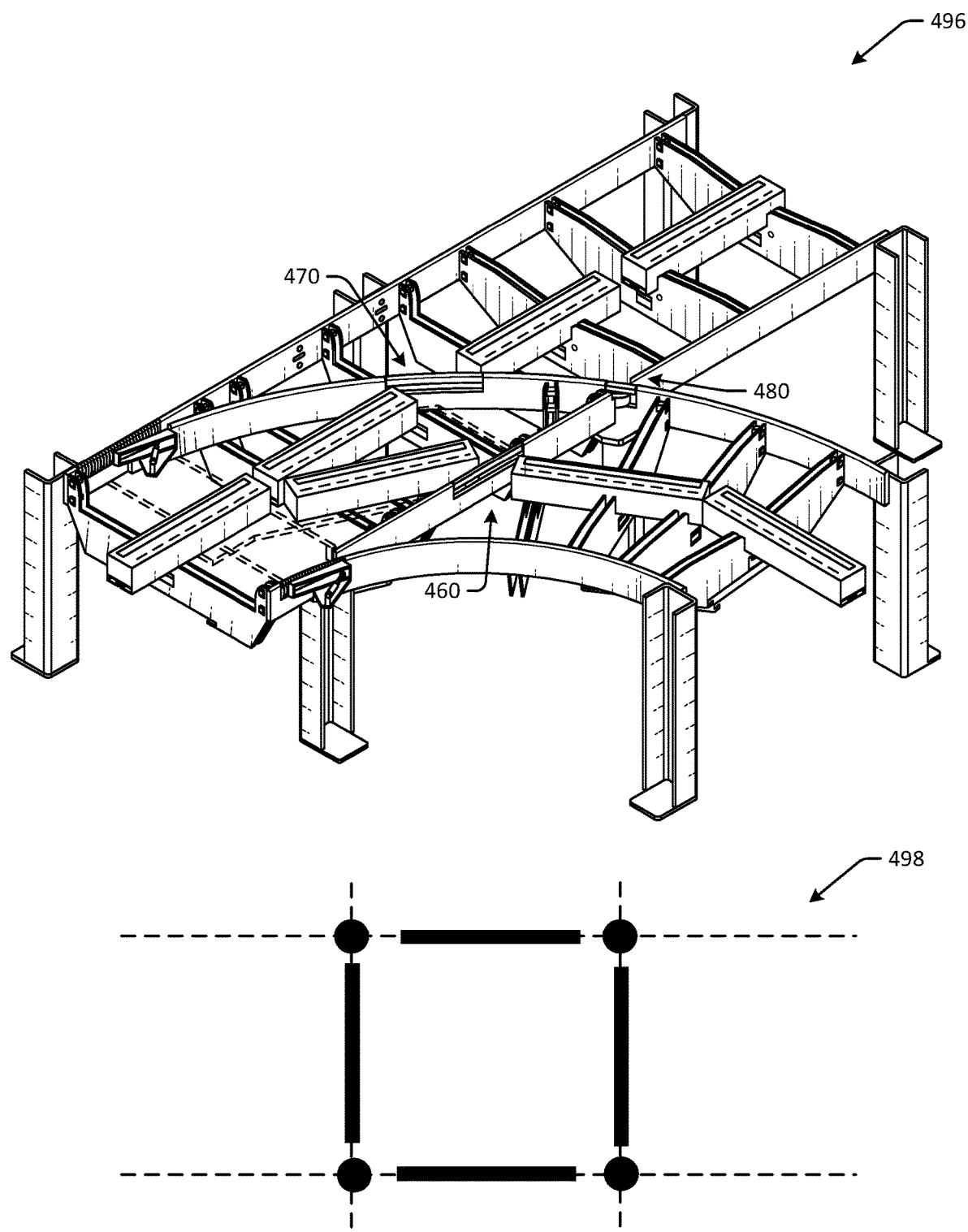

Although depicted in FIGS. 4A-4C as a straight set of rails with a left-handed curve set of rails, the retractable rail system 400 may be used with any configuration of rails where a shuttle can move from one set of rails to another. For example, as illustrated in FIG. 4D in perspective view 496, the retractable rail system 400 may be used with a right-handed curved set of rails. Other embodiments may include merging, three-way junctions (e.g., straight, left, and right, etc.), and other instances where shuttles can change directions.

In another embodiment 498, two straight or linear sections of rail may intersect perpendicularly. In such embodiments, four rotating actuators may be included, with one rotating actuator or rotating rail segment at each of the four corners of intersection between the rails, along with four retractable rail segment assemblies disposed in between the sets of rails adjacent to each pair of rotating rail segments. Such embodiments may allow for shuttles to pass over other sets of tracks without risking impact between the rails and the magnets.

Accordingly, the retractable rail system 400 may be a system that includes a set of rails having a linear rail segment (e.g., a rail of the first set of rails 420), and a curved rail segment (e.g., a rail of the second set of rails 450). The retractable rail system 400 may optionally include a shuttle configured to transport individual items from a first location to a second location using the set of rails.

The retractable rail system 400 may include the first retractable rail segment assembly 460 disposed adjacent to the linear rail segment of the first set of rails 420. The first retractable rail segment assembly 460 may include a first rail segment configured to move vertically from a first position aligned with the linear rail segment to a second position that is retracted with respect to the linear rail segment. The retractable rail system 400 may include a first actuator configured to push the first rail segment from the second position to the first position, and a first biasing member, such as a first spring, configured to pull the first rail segment from the first position to the second position.

The retractable rail system 400 may include the second retractable rail segment assembly 470 disposed adjacent to the curved rail segment of the second set of rails 450. The second retractable rail segment assembly 470 may include a second rail segment configured to move vertically from a first position aligned with the curved rail segment to a second position that is retracted with respect to the curved rail segment. The retractable rail system 400 may include a second actuator configured to push the second rail segment from the second position to the first position, and a second spring configured to pull the second rail segment from the first position to the second position.

The retractable rail system 400 may include the rotating rail segment 480 that is configured to rotate from a first position aligned with the linear rail segment to a second position aligned with the curved rail segment, and a third actuator configured to rotate the rotating rail segment from the first position to the second position.

FIG. 5 depicts a retractable rail segment assembly 500 in accordance with one or more embodiments of the disclosure. Other embodiments may include additional or fewer components. The illustrations of FIG. 5 is not to scale, and may not be illustrated to scale with respect to other figures. The retractable rail segment assembly illustrated in FIG. 5 may be the same retractable rail segment assembly discussed with respect to FIGS. 1-4.

The retractable rail segment assembly 500 may include a first rail segment 520 that may be a portion of rail. The retractable rail segment assembly may be configured to move the first rail segment 520 between a downwards or retracted position 510 and an upwards or non-retracted position 512. As depicted in schematic side view, in the retracted position 510, the first rail segment 520 may be recessed or lower than the remainder of the rail. In the non-retracted position 512, the first rail segment 520 may be level with, or otherwise aligned with, the remainder of the rail. Accordingly, a shuttle may ride over the first rail segment 520 when the first rail segment 520 is in the non-retracted position 512 for a smooth and uninterrupted ride. When the first rail segment 520 is in the retracted position 510, the shuttle may pass over the first rail segment 520 without impacting the first rail segment 520 with a magnet under the shuttle.

The retractable rail segment assembly 500 may toggle or otherwise move between the two positions. The retractable rail segment assembly 500 may include an actuator, an optional spring based retracting system, and one or more linear guides to facilitate vertical movement of the first rail segment 520. In some embodiments, the retractable rail segment assembly 500 may include one or more pneumatic bellows that, when pressurized, provide upward displacement for the first rail segment 520. When the air pressure is removed, springs may be used to pull the first rail segment 520 downwards. Other embodiments may use different actuation mechanisms, such as solenoids, motorized linear drives, and other actuators. Some embodiments may use two-way pneumatic cylinders, which may eliminate the need for spring-based retraction. Similarly, embodiments may include a second actuator that is configured to pull or push the first rail segment 520 downwards from the first position to the second position.

The retractable rail segment assembly 500 may be a linear retractable rail segment assembly. Accordingly, the retractable rail segment assembly 500 may be disposed in a cutout portion of a linear rail segment or linear rail 590. For example, the linear rail 590 may include a cutout portion, and the retractable rail segment assembly 500 may include a base plate 592 that is coupled to the cutout portion of the linear rail 590. The base plate 592 may have a linear configuration to match the linear configuration of the first rail segment 520.

The first rail segment 520 may be configured to move vertically from a first position aligned with the linear rail segment (e.g., the non-retracted position 512, etc.) to a second position that is retracted with respect to the linear rail segment (e.g., the retracted position 510, etc.). In some embodiments, the second position may be a default position of the first rail segment 520, while in other embodiments, the first position may be a default position of the first rail segment 520.

One or more springs may be used to pull the first rail segment 520 downwards in the retracted position 510. For example, the retractable rail segment assembly 500 may include a first spring 570 configured to pull the first rail segment 520 from the first position to the second position. The retractable rail segment assembly 500 may include any number of springs. For example, the retractable rail segment assembly 500 may include two springs disposed on a first side of the first rail segment 520, such as the first spring 570 and a second spring 572, and another two springs disposed on a second side of the first rail segment 520, for a total of four springs. The first spring 570 and second spring 572 may be disposed on a first side of the first rail segment 520, a third spring and fourth spring may be disposed on a second side of the first rail segment 520. The first spring 570 may be disposed at or near a first end of the first rail segment 520, and the second spring 572 may be disposed at or near a second end of the first rail segment 520.

The springs may be coupled to respective pins that extend through, or are otherwise coupled to, the first rail segment 520. For example, the first spring 570 may be coupled to a first pin 580 and a second pin 582. The first pin 580 may move vertically with the first rail segment 520, and the second pin 582 may be coupled to the linear rail segment and may serve as an anchor point. The first pin 580 may move along a slot 562 disposed in a support 560. The support 560 may be coupled to the linear rail segment, and may not be directly coupled to the first rail segment 520. For example, the first rail segment 520 may move vertically, with vertical motion limited by the dimensions of the slot 562 in the support 560. As the first pin 580 moves in the slot 562, the first rail segment 520 may move vertically. In some embodiments, the pins may extend through the first rail segment 520, whereas in other embodiments, the pins may be an integrated part of the first rail segment 520.

The retractable rail segment assembly 500 may include a first actuator 530 configured to push the first rail segment 520 from the second position or the retracted position 510 to the first position or non-retracted position 512. In some embodiments, the retractable rail segment assembly 500 may include a second actuator 540 configured to push the first rail segment 520 from the second position or the retracted position 510 to the first position or non-retracted position 512. Any number of actuators may be used. The depicted embodiment with two actuators may provide improved durability and balance for the retractable rail segment assembly 500. The first actuator 530 and/or the second actuator 540 may be coupled to the base plate 592. Other embodiments may use actuators such as pneumatic cylinders (which may provide a more compact form factor and reduced complexity of moving parts), solenoid and cam actuators, two-way cylinders, and other actuators. The first actuator 530 may be disposed adjacent to a first end of the base plate 592, and the second actuator 540 may be disposed adjacent to a second end of the base plate 592. Instead of two actuators that move the first rail segment 520 from the retracted position to the non-retracted position, other embodiments may include two actuators where one actuator moves the first rail segment 520 from the retracted position to the non-retracted position, and another actuator moves the first rail segment 520 from the non-retracted position to the retracted position (e.g., an actuator may be used instead of the spring(s), etc.).

The first actuator 530 and/or the second actuator 540 may be pneumatic air bellows. The pneumatic air bellows may be expanded using air to actuate the first rail segment 520 upwards, and may be deflated to actuate the first rail segment 520 downwards. The spring force provided by the springs may facilitate downward movement. In some embodiments, a circular metal component 532, 542 such as a coin or washer, may be disposed between the respective first pneumatic air bellow or actuator 530 and the first rail segment 520, and the second actuator 540 and the first rail segment 520. The circular metal components 532, 542 may not be coupled to the first rail segment 520 and/or the actuators. Instead, the circular components may be free floating, and may provide structural rigidity so as to prevent damage to the material forming the pneumatic bellows. In some embodiments, the circular components may be formed of a material other than metal, and may be coupled to the actuators. For example, the first circular metal component 532 may be coupled to the first actuator 530 with an adhesive, and the second circular metal component 542 may be coupled to the second actuator 540 with an adhesive.

In some embodiments, one or more slides may be used to provide additional support and to guide vertical movement of the first rail segment 520. For example, the first rail segment 520 may include a rail mounting plate 522 having an aperture. The first retractable rail segment assembly 500 may include one or more linear slides 550 coupled to the base plate 592. The linear slides 550 may be disposed in the aperture of the rail mounting plate 522. The linear slides 550 may include a head disposed at a distal end. The rail mounting plate 522 may be configured to slide vertically along the linear slides 550. The head of the linear slide 550 may be configured to limit upward movement of the rail mounting plate 522. The linear slide 550 may therefore guide vertical movement of the first rail segment 520, while also providing structural rigidity against lateral force. One or more bronze or nylon bushings 524 or other components may be used to facilitate sliding between the rail mounting plate 522 and the linear slides 550. The linear slides 550 may be linear shafts that slide in a bushing and have a guide pin that slides in a slot. In the illustrated embodiment, a first linear slide may be used on a first side of the first rail segment 550, and a second linear slide may be used on a second side of the first rail segment 520. The linear slides may be disposed at or near a middle of the first rail segment 520. Any number of linear slides may be used.

FIG. 6 is a schematic illustration of a retractable rail segment assembly 600 in accordance with one or more embodiments of the disclosure. Other embodiments may include additional or fewer components. The illustration of FIG. 6 is not to scale, and may not be illustrated to scale with respect to other figures. The retractable rail segment assembly illustrated in FIG. 6 may be the same retractable rail components for container shuttle rails system discussed with respect to FIGS. 1-5.

The retractable rail segment assembly 600 may be a curved retractable rail segment assembly, unlike the linear retractable rail segment assembly of FIG. 5. The retractable rail segment assembly 600 may include a curved rail segment 610 and a second rail segment 620 configured to move vertically from a first position aligned with the curved rail segment 610 to a second position that is retracted with respect to the curved rail segment 610. The second rail segment 620 may be a curved rail segment. The retractable rail segment assembly 600 may include a base plate 650 having a curved configuration, and the second rail segment 620 may have the same curved configuration.

The retractable rail segment assembly 600 may include the same or similar components to that of the retractable rail segment assembly 500 discussed with respect to FIG. 5. For example, the retractable rail segment assembly 600 may include a first actuator 630 and a second actuator 660 configured to provide an upward force on the second rail segment 620, and one or more springs 670 configured to provide a downward force on the second rail segment 620. The retractable rail segment assembly 600 may include a rail mounting plate 640 that can interface with linear slides to provide additional stability.

The retractable rail segment assembly 600 may therefore provide a curved retractable rail segment that can be used to both provide a curved rail on which a shuttle can ride to change directions, as well as retracting functionality to allow a shuttle to pass over without impact.

One or more operations of the methods, process flows, or use cases of FIGS. 1-6 may have been described above as being performed by a user device, or more specifically, by one or more program module(s), applications, or the like executing on a device. It should be appreciated, however, that any of the operations of the methods, process flows, or use cases of FIGS. 1-6 may be performed, at least in part, in a distributed manner by one or more other devices, or more specifically, by one or more program module(s), applications, or the like executing on such devices. In addition, it should be appreciated that processing performed in response to the execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-6 may be described in the context of the illustrative devices, it should be appreciated that such operations may be implemented in connection with numerous other device configurations.

The operations described and depicted in the illustrative methods, process flows, and use cases of FIGS. 1-6 may be carried out or performed in any suitable order, such as the depicted orders, as desired in various example embodiments of the disclosure. Additionally, in certain example embodiments, at least a portion of the operations may be carried out in parallel. Furthermore, in certain example embodiments, less, more, or different operations than those depicted in FIGS. 1-6 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by the execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Computer Architecture

Figure 7:
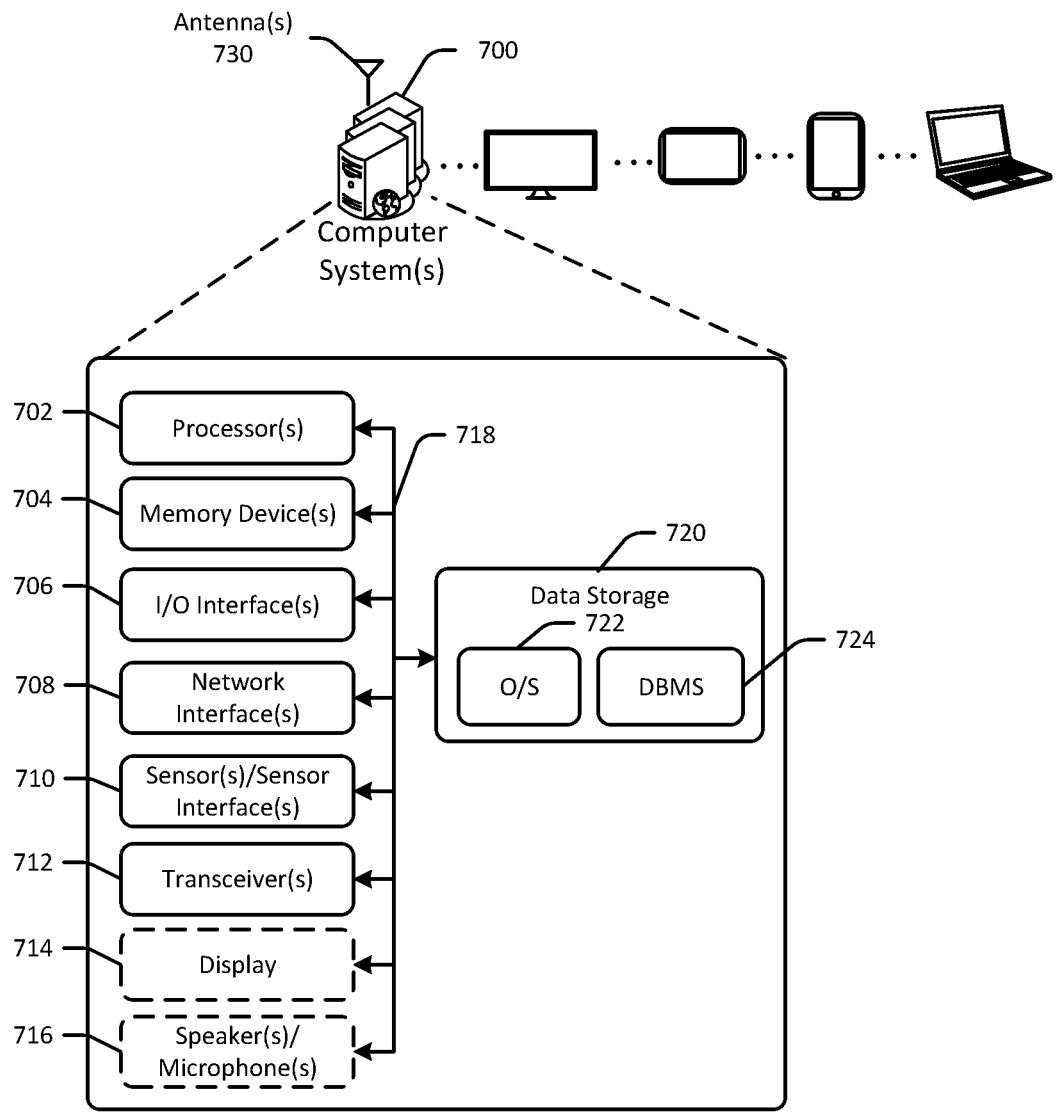
FIG. 7 schematically illustrates an example architecture of a computer system associated with a retractable rail system in accordance with one or more embodiments of the disclosure.

FIG. 7 is a schematic block diagram of one or more illustrative computer system(s) 700 associated with a retractable rail system in accordance with one or more example embodiments of the disclosure. The computer system(s) 700 may include any suitable computing device including, but not limited to, a server system, a voice interaction device, a mobile device such as a smartphone, a tablet, an e-reader, a wearable device, or the like; a desktop computer; a laptop computer; a content streaming device; or the like. The computer system(s) 700 may correspond to an illustrative device configuration for the controller(s) of FIGS. 1-6. For example, the computer system(s) 700 may be a controller and may control one or more aspects of the retractable rail components for container shuttle rails described in FIGS. 1-6.

The computer system(s) 700 may be configured to communicate with one or more servers, user devices, or the like. The computer system(s) 700 may be configured to control rail switches, identify shuttles, direct shuttles, move shuttles, and so forth.

The computer system(s) 700 may be configured to communicate via one or more networks. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the computer system(s) 700 may include one or more processors (processor(s)) 702, one or more memory devices 704 (also referred to herein as memory 704), one or more input/output (I/O) interface(s) 706, one or more network interface(s) 708, one or more sensor(s) or sensor interface(s) 710, one or more transceiver(s) 712, one or more optional display(s) 714, one or more optional microphone(s) 716, and data storage 720. The computer system(s) 700 may further include one or more bus(es) 718 that functionally couple various components of the computer system(s) 700. The computer system(s) 700 may further include one or more antenna(s) 730 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 718 may include at least one of a system bus, a memory bus, an address bus, or a message bus, and may permit the exchange of information (e.g., data (including computer-executable code), signaling, etc.) between various components of the computer system(s) 700. The bus(es) 718 may include, without limitation, a memory bus or a memory controller, a peripheral bus, an accelerated graphics port, and so forth. The bus(es) 718 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnect (PCI) architecture, a PCI-Express architecture, a Personal Computer Memory Card International Association (PCMCIA) architecture, a Universal Serial Bus (USB) architecture, and so forth.

The memory 704 of the computer system(s) 700 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 704 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 704 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 720 may include removable storage and/or non-removable storage including, but not limited to, magnetic storage, optical disk storage, and/or tape storage. The data storage 720 may provide non-volatile storage of computer-executable instructions and other data. The memory 704 and the data storage 720, removable and/or non-removable, are examples of computer-readable storage media (CRSM) as that term is used herein.

The data storage 720 may store computer-executable code, instructions, or the like that may be loadable into the memory 704 and executable by the processor(s) 702 to cause the processor(s) 702 to perform or initiate various operations. The data storage 720 may additionally store data that may be copied to the memory 704 for use by the processor(s) 702 during the execution of the computer-executable instructions. Moreover, output data generated as a result of execution of the computer-executable instructions by the processor(s) 702 may be stored initially in the memory 704, and may ultimately be copied to the data storage 720 for non-volatile storage.

More specifically, the data storage 720 may store one or more operating systems (O/S) 722; one or more database management systems (DBMS) 724; and one or more program module(s), applications, engines, computer-executable code, scripts, or the like. Some or all of these module(s) may be sub-module(s). Any of the components depicted as being stored in the data storage 720 may include any combination of software, firmware, and/or hardware. The software and/or firmware may include computer-executable code, instructions, or the like that may be loaded into the memory 704 for execution by one or more of the processor(s) 702. Any of the components depicted as being stored in the data storage 720 may support functionality described in reference to corresponding components named earlier in this disclosure.

The data storage 720 may further store various types of data utilized by the components of the computer system(s) 700. Any data stored in the data storage 720 may be loaded into the memory 704 for use by the processor(s) 702 in executing computer-executable code. In addition, any data depicted as being stored in the data storage 720 may potentially be stored in one or more datastore(s) and may be accessed via the DBMS 724 and loaded in the memory 704 for use by the processor(s) 702 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like.

The processor(s) 702 may be configured to access the memory 704 and execute the computer-executable instructions loaded therein. For example, the processor(s) 702 may be configured to execute the computer-executable instructions of the various program module(s), applications, engines, or the like of the computer system(s) 700 to cause or facilitate various operations to be performed in accordance with one or more embodiments of the disclosure. The processor(s) 702 may include any suitable processing unit capable of accepting data as input, processing the input data in accordance with stored computer-executable instructions, and generating output data. The processor(s) 702 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 702 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 702 may be capable of supporting any of a variety of instruction sets.

Referring now to other illustrative components depicted as being stored in the data storage 720, the O/S 722 may be loaded from the data storage 720 into the memory 704 and may provide an interface between other application software executing on the computer system(s) 700 and the hardware resources of the computer system(s) 700. More specifically, the O/S 722 may include a set of computer-executable instructions for managing the hardware resources of the computer system(s) 700 and for providing common services to other application programs (e.g., managing memory allocation among various application programs). In certain example embodiments, the O/S 722 may control execution of the other program module(s). The O/S 722 may include any operating system now known or which may be developed in the future including, but not limited to, any server operating system, any mainframe operating system, or any other proprietary or non-proprietary operating system.

The DBMS 724 may be loaded into the memory 704 and may support functionality for accessing, retrieving, storing, and/or manipulating data stored in the memory 704 and/or data stored in the data storage 720. The DBMS 724 may use any of a variety of database models (e.g., relational model, object model, etc.) and may support any of a variety of query languages. The DBMS 724 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the computer system(s) 700 is a mobile device, the DBMS 724 may be any suitable lightweight DBMS optimized for performance on a mobile device.

Referring now to other illustrative components of the computer system(s) 700, the input/output (I/O) interface(s) 706 may facilitate the receipt of input information by the computer system(s) 700 from one or more I/O devices as well as the output of information from the computer system(s) 700 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the computer system(s) 700 or may be separate. The I/O devices may further include, for example, any number of peripheral devices such as data storage devices, printing devices, and so forth.

The I/O interface(s) 706 may also include an interface for an external peripheral device connection such as universal serial bus (USB), FireWire, Thunderbolt, Ethernet port or other connection protocol that may connect to one or more networks. The I/O interface(s) 706 may also include a connection to one or more of the antenna(s) 730 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, a ZigBee network, etc.

The computer system(s) 700 may further include one or more network interface(s) 708 via which the computer system(s) 700 may communicate with any of a variety of other systems, platforms, networks, devices, and so forth. The network interface(s) 708 may enable communication, for example, with one or more wireless routers, one or more host servers, one or more web servers, and the like via one or more networks.

The antenna(s) 730 may include any suitable type of antenna depending, for example, on the communications protocols used to transmit or receive signals via the antenna(s) 730. Non-limiting examples of suitable antenna(s) may include directional antenna(s), non-directional antenna(s), dipole antenna(s), folded dipole antenna(s), patch antenna(s), multiple-input multiple-output (MIMO) antenna(s), or the like. The antenna(s) 730 may be communicatively coupled to one or more transceivers 712 or radio components to which or from which signals may be transmitted or received.

As previously described, the antenna(s) 730 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(s) 730 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(s) 730 may be configured to transmit or receive radio frequency signals within any suitable frequency range forming part of the unlicensed portion of the radio spectrum.

The antenna(s) 730 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 712 may include any suitable radio component(s) for—in cooperation with the antenna(s) 730—transmitting or receiving radio frequency (RF) signals in the bandwidth and/or channels corresponding to the communications protocols utilized by the computer system(s) 700 to communicate with other devices. The transceiver(s) 712 may include hardware, software, and/or firmware for modulating, transmitting, or receiving—potentially in cooperation with any of antenna(s) 730—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 712 may further include hardware, firmware, or software for receiving GNSS signals. The transceiver(s) 712 may include any known receiver and baseband suitable for communicating via the communications protocols utilized by the computer system(s) 700. The transceiver(s) 712 may further include a low noise amplifier (LNA), additional signal amplifiers, an analog-to-digital (A/D) converter, one or more buffers, a digital baseband, or the like.

The sensor(s)/sensor interface(s) 710 may include or may be capable of interfacing with any suitable type of sensing device such as, for example, inertial sensors, force sensors, thermal sensors, photocells, and so forth. Example types of inertial sensors may include accelerometers (e.g., MEMS-based accelerometers), gyroscopes, and so forth.

The optional display(s) 714 may be configured to output light and/or render content. The optional speaker(s)/microphone(s) 716 may be any device configured to receive analog sound input or voice data.

It should be appreciated that the program module(s), applications, computer-executable instructions, code, or the like depicted in FIG. 7 as being stored in the data storage 720 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the computer system(s) 700, and/or hosted on other computing device(s) accessible via one or more networks, may be provided to support functionality provided by the program module(s), applications, or computer-executable code depicted in FIG. 7 and/or additional or alternate functionality. Further, functionality may be modularized differently such that processing described as being supported collectively by the collection of program module(s) depicted in FIG. 7 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 7 may be implemented, at least partially, in hardware and/or firmware across any number of devices.

It should further be appreciated that the computer system(s) 700 may include alternate and/or additional hardware, software, or firmware components beyond those described or depicted without departing from the scope of the disclosure. More particularly, it should be appreciated that software, firmware, or hardware components depicted as forming part of the computer system(s) 700 are merely illustrative and that some components may not be present or additional components may be provided in various embodiments. While various illustrative program module(s) have been depicted and described as software module(s) stored in the data storage 720, it should be appreciated that functionality described as being supported by the program module(s)

may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether That which is claimed is:

1. A system comprising:
   a set of rails comprising a linear rail segment and a curved rail segment;
   a shuttle configured to transport individual items from a first location to a second location using the set of rails;
   a first retractable rail segment assembly disposed adjacent to the linear rail segment, the first retractable rail segment assembly comprising:
      a first rail segment configured to move vertically from a first position aligned with the linear rail segment to a second position that is retracted with respect to the linear rail segment;
      a first actuator configured to push the first rail segment from the second position to the first position; and
      a first spring configured to pull the first rail segment from the first position to the second position; and
   a second retractable rail segment assembly disposed adjacent to the curved rail segment, the second retractable rail segment assembly comprising:
      a second rail segment configured to move vertically from a first position aligned with the curved rail segment to a second position that is retracted with respect to the curved rail segment;
      a second actuator configured to push the second rail segment from the second position to the first position; and
      a second spring configured to pull the second rail segment from the first position to the second position.

2. The system of claim 1, further comprising:
   a rotating rail segment configured to rotate from a first position aligned with the linear rail segment to a second position aligned with the curved rail segment; and
   a third actuator configured to rotate the rotating rail segment from the first position to the second position.

3. The system of claim 1, wherein the first rail segment comprises a rail mounting plate having an aperture, and wherein the first retractable rail segment assembly further comprises:
   a base plate coupled to the first actuator; and
   a linear slide coupled to the base plate and disposed in the aperture of the rail mounting plate, the linear slide comprising a head disposed at a distal end;
   wherein the rail mounting plate is configured to slide vertically along the linear slide, and wherein the head of the linear slide is configured to limit upward movement of the rail mounting plate.

4. The system of claim 1, wherein the first retractable rail segment assembly further comprises a first base plate having a linear configuration, and the second retractable rail segment assembly further comprises a second base plate having a curved configuration; and
   wherein the first rail segment has the linear configuration, and the second rail segment has the curved configuration.

5. A system for a shuttle, the system comprising:
   a linear rail segment; and
   a first retractable rail segment assembly disposed adjacent to the linear rail segment, the first retractable rail segment assembly comprising:
      a first rail segment configured to move vertically from a first position aligned with the linear rail segment to a second position that is retracted with respect to the linear rail segment;
      a first spring configured to pull the first rail segment from the first position to the second position, wherein the first spring is disposed on a first side of the first rail segment; and
      a first actuator configured to actuate the first rail segment from the second position to the first position.

6. The system of claim 5, further comprising:
   a curved rail segment; and
   a second retractable rail segment assembly disposed adjacent to the curved rail segment, the second retractable rail segment assembly comprising:
      a second rail segment configured to move vertically from a first position aligned with the curved rail segment to a second position that is retracted with respect to the curved rail segment;
      a second actuator configured to push the second rail segment from the second position to the first position; and
      a second spring configured to pull the second rail segment from the first position to the second position.

7. The system of claim 6, further comprising:
   a rotating rail segment configured to rotate from a first position aligned with the linear rail segment to a second position aligned with the curved rail segment; and
   a third actuator configured to rotate the rotating rail segment from the first position to the second position.

8. The system of claim 5, further comprising:
   a second spring configured to pull the first rail segment from the first position to the second position, wherein the second spring is disposed on a second side of the first rail segment.

9. The system of claim 8, wherein the first spring is disposed at a first end of the first rail segment, and the second spring is disposed at a second end of the first rail segment.

10. The system of claim 5, further comprising:
    a second actuator configured to actuate the first rail segment from the first position to the second position.

11. The system of claim 5, wherein the first actuator is a first pneumatic air bellow, and wherein the first retractable rail segment assembly further comprises:
    a circular metal component disposed between the first pneumatic air bellow and the first rail segment;
    wherein the circular metal component is not coupled to the first rail segment.

12. The system of claim 5, wherein the first rail segment comprises a rail mounting plate having an aperture, and wherein the first retractable rail segment assembly further comprises:
    a base plate coupled to the first actuator; and
    a linear slide coupled to the base plate and disposed in the aperture of the rail mounting plate, the linear slide comprising a head disposed at a distal end;
    wherein the rail mounting plate is configured to slide vertically along the linear slide; and
    wherein the head of the linear slide is configured to limit upward movement of the rail mounting plate.

13. The system of claim 5, wherein the first actuator is a two-way actuator that is further configured to actuate the first rail segment from the first position to the second position.

14. The system of claim 5, wherein the first actuator is a first pneumatic air bellow, and wherein the first retractable rail segment assembly further comprises:

a base plate;
a second pneumatic air bellow;
wherein the first pneumatic air bellow is disposed adjacent to a first end of the base plate, and the second pneumatic air bellow is disposed adjacent to a second end of the base plate.

15. The system of claim 5, wherein the second position is a default position of the first rail segment.

16. A system for a shuttle, the system comprising:
a linear rail segment;
a curved rail segment;
a first retractable rail segment assembly disposed adjacent to the linear rail segment, the first retractable rail segment assembly comprising:
  a first rail segment configured to move vertically from a first position aligned with the linear rail segment to a second position that is retracted with respect to the linear rail segment;
a second retractable rail segment assembly disposed adjacent to the curved rail segment, the second retractable rail segment assembly comprising:
  a second rail segment configured to move vertically from a first position aligned with the curved rail segment to a second position that is retracted with respect to the curved rail segment;
  a rotating rail segment configured to rotate from a first position aligned with the linear rail segment to a second position aligned with the curved rail segment; and
  a third actuator configured to rotate the rotating rail segment from the first position to the second position.

17. The system of claim 16, wherein the first retractable rail segment assembly further comprises:
a first base plate having a linear configuration;
a first actuator configured to push the first rail segment from the second position to the first position; and
a first spring configured to pull the first rail segment from the first position to the second position.

18. The system of claim 17, wherein the linear rail segment comprises a cutout portion, and wherein the first base plate is coupled to the cutout portion.

19. The system of claim 17, wherein the second retractable rail segment assembly further comprises:
a second base plate having a curved configuration;
a second actuator configured to push the second rail segment from the second position to the first position; and
a second spring configured to pull the second rail segment from the first position to the second position.

* * * * *